3,245,986
19-HYDROXY-10α-CORTICOIDS
Alexander D. Cross, Mexico City, Mexico, assignor to Syntex Corporation, Panama, Panama, a corporation of Panama
No Drawing. Filed Oct. 19, 1962, Ser. No. 231,832
17 Claims. (Cl. 260—239.55)

The present invention relates to novel cyclopentanophenanthrene derivatives and to a process for the production thereof.

More particularly the present invention relates to novel 19-hydroxy-10α derivatives of cortical hormones.

The novel compounds of the present invention are represented by the following formulae:

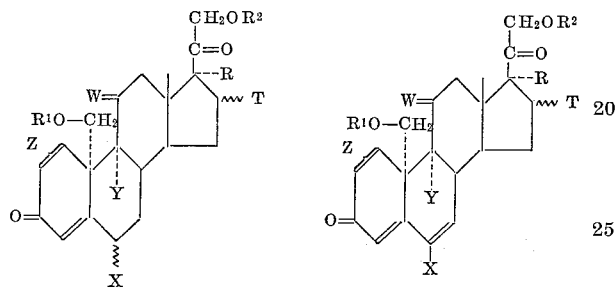

In the above formulae X represents hydrogen, fluorine, chlorine or methyl, all having α or β configuration; R is a hydroxyl group; T represents hydrogen, hydroxyl, acyloxy, or methyl; T and R together represent the group

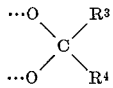

in the 16α,17α-positions, wherein $R^3$ and $R^4$ each represents hydrogen or a hydrocarbon residue of up to 8 carbon atoms of straight, branched, cyclic or mixed aliphatic cyclic chain, or aromatic, such as methyl, ethyl, isopropyl, phenyl, methyl-cyclohexyl and the like; $R^1$ and $R^2$ each represents hydrogen or a hydrocarbon carboxylic acyl group of less than 12 carbon atoms; Z represents a double bond or a saturated linkage between C–1 and C–2; W represents a β-hydroxyl group or a keto group; and Y represents hydrogen, fluorine or chlorine.

The acyl and acyloxy groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formula are valuable cortical hormones with high anti-inflammatory, low catabolic, glycogenic and thymolytic activities. In addition, they are anti-androgenic, anti-gonadotrophic and anti-estrogenic hormones. Furthermore, they have high topical activity in skin disorders such as psoriasis, allergic dermatitis and the like.

The novel compounds of the present invention are prepared by the process exemplified as follows:

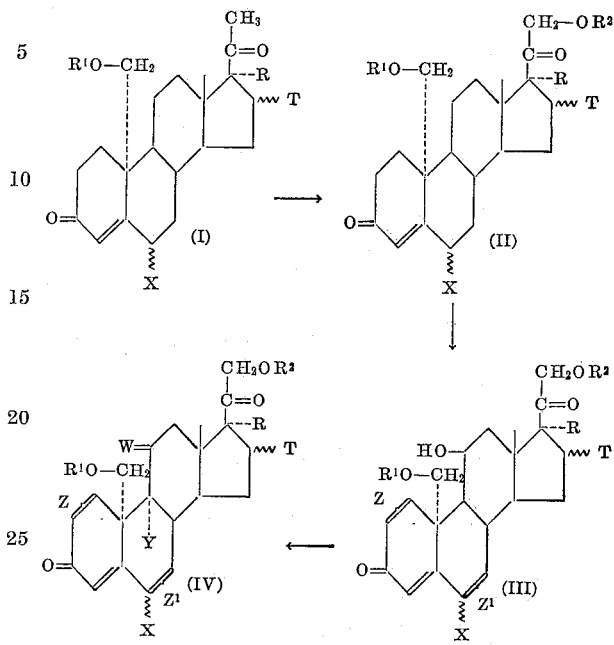

In the above formulae R, $R^1$, $R^2$, T, X, W, Y, and Z have the same meaning as previously described and $Z^1$ represents a double bond or a saturated linkage between C–6 and C–7.

The starting compounds of the present invention (I) which is a Δ⁴-10α-pregnen-19-ol-3,20-dione derivative, is prepared from the corresponding 2,19-cyclo-allopregnane-3,20-dione derivatives in accordance with my copending U.S. patent application Serial No. 231,831, filed of even date, by treatment with a strong acid or a strong base, followed by conventional introduction of a Δ⁴ double bond into the resulting 10α-allopregnan-19-ol-3,20-dione by treatment with 2 mol. equivalents of bromine in the presence of hydrogen bromide followed successively by reaction with sodium iodide, and treatment with chromous chloride.

In carrying out the process in accordance with the above equation the starting Δ⁴-10α-pregnen-19-ol-3,20-dione derivative is treated with iodine in the presence of calcium oxide to give the corresponding 21-iodo derivative which upon treatment with potassium acetate, in a suitable solvent, such as acetone, preferably at reflux temperature affords the corresponding 21-acetoxy-Δ⁴-10α-pregnen-19-ol-3,20-dione (II). The latter compound upon incubation with adrenal glands in a suitable medium, e.g., an aqueous solution of alkali metal phosphates and chlorides and magnesium sulfate, mixed with an aqueous solution of fumaric acid and sodium hydroxide for a period of time of the order of 3 hours at approximately 28–37° C., yields the corresponding 21-acetoxy-Δ⁴-10α-pregnene-11β,19-diol-3,20-dione (III).

The latter 21-acetoxy-11β,19-diol (III) is treated with approximately 1 molar equivalent of an acylating agent such as acetic anhydride, in pyridine to give the corresponding 19,21-diacetoxy derivative (III: $R^1$=acyl, $R^2$=acyl). Upon treatment of the latter compound with methyl chloride in dimethylformamide and pyridine at approximately 18° C. for about half an hour, yields the corresponding 9,21 - diacetoxy - $\Delta^{4,9(11)}$-10α - pregnadiene-3,20-dione derivative.

The last named $\Delta^{4,9(11)}$-derivative is treated with an N-bromoimide or amide, such as bromo-acetamide in the presence of perchloric acid, in an inert solvent, such as for example dioxane, to give the corresponding $\Delta^4$-9α-bromo-11β-ol which upon treatment with the mild base such as potassium acetate, in a suitable solvent e.g., acetone, preferably at reflux temperature affords the corresponding 19,21-diacetoxy-9β,11β-oxido-$\Delta^4$-10α-pregnene-3,20- dione derivative. The latter 9β,11β-oxido compound upon treatment with a hydrogen halide such as hydrogen fluoride or hydrogen chlorine in an inert organic solvent, e.g., methylene chloride or chloroform yields the corresponding 19,21-diacetoxy 9α-halo-$\Delta^4$-10α-pregnen-11β-ol-3,20-dione compound (IV: Y=halogen, W=β-OH).

The 11β-hydroxyl group of the latter compounds and of the 9α-unsubstituted 11β-ols (III), after previous conventional protection of the 19 and 21-hydroxyl groups, as by esterification, is oxidized preferably with Jones reagent (chromium trioxide in sulfuric acid) thus affording the corresponding ketones (IV: W=keto).

The $\Delta^4$-10α-pregnene derivatives of the present invention (III, IV: Z=Z$^1$=saturated linkage), upon reaction in chloranil in t-butanol at reflux temperature for approximately 8 to 10 hours, yield the corresponding $\Delta^{4,6}$ derivatives (III, IV: Z=saturated linkage, Z$^1$=double bond).

The $\Delta^4$-10α-pregnene derivatives of the present invention (III, IV: Z=Z$^1$=saturated linkage), are treated with 2,3-dichloro-5,6-dicyano 1,4-benzoquinone, in a suitable solvent such as dioxane, preferably at reflux temperature for a period of time of the order of 10 hours, to produce the corresponding $\Delta^{1,4}$-10α-pregnadiene derivative (III, IV: Z=double bond, Z$^1$=saturated linkage).

When treating the aforesaid $\Delta^{4,6}$-compounds with 2,3-dichloro-5,6-dicyano 1,4-benzoquinone under the same conditions as described hereinbefore, there are obtained the corresponding $\Delta^{1,4,6}$-10α-pregnatriene derivatives (III, IV: Z=Z$^1$=double bond).

The compounds of the present invention having a 16α,17α-ketonide grouping, yield the corresponding 16α,17α-diols by conventional treatment with an acid, such as acetic acid. The obtained diols, upon conventional esterification in pyridine with an acylating agent, as for example acetic anhydride or caproic anhydride, afford the corresponding 16-acylates.

The latter 16α,17α-diols upon conventional condensation with a ketone or aldehyde, such as benzaldehyde, acetophenone, methyl-ethyl ketone, acetone, and the like, in the presence of an acid, yield the corresponding 16α,17α-methylenedioxy derivatives, wherein the substituents in the methylenedioxy group may be different from those of the previously hydrolyzed ketonide grouping.

The compounds of the present invention having a 19 and/or 21-acyloxy group, are saponified by conventional treatment with a base to produce the corresponding 19 and/or 21-free alcohols which, in turn, may be acylated conventionally in pyridine with an acylating agent to give the corresponding 19 and/or 21-acylates, wherein the acyl group may be different from the previously saponified one.

The following specific examples serve to illustrate the present invention, but are not intended to limit the scope thereof.

*Example I*

A cooled solution of 4 g. of 16α,17α-isopropylidenedi-oxy-$\Delta^4$-10α-pregnen-19-ol-3,20-dione (obtained in accordance with my copending patent application Ser. No. 231,831, filed of even date) in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the 21-iodo derivative of the starting material. This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding 21-acetoxy-16α,17α-isopropylidenedioxy-$\Delta^4$-10α-pregnen-19-ol-3,20-dione (Cpd. No. 1).

The starting compounds listed under I (obtained according to my aforesaid patent application) were treated by the same procedures, thus furnishing firstly the corresponding 21-iodo derivatives and secondly the respective products set forth under II.

| I | Cpd. No. | II |
|---|---|---|
| $\Delta^4$-10α-pregnene-17α, 19-diol-3, 20-dione. | 2 | 21-acetoxy-$\Delta^4$-10α-pregnene-17α, 19-diol-3, 20-dione. |
| 16α-methyl-$\Delta^4$-10α-pregnene-17α, 19-diol-3, 20-dione. | 3 | 21-acetoxy-16α-methyl-$\Delta^4$-10α-pregnene-17α, 19-diol-3, 20-dione. |
| 6β-chloro-$\Delta^4$-10α-pregnene-17α, 19-diol-3, 20-dione. | 4 | 21-acetoxy-6β-chloro-$\Delta^4$-10α-pregnene-17α, 19-diol-3, 20-dione. |
| 6β-chloro-16α-methyl-$\Delta^4$-10α-pregnene-17α, 19-diol-3, 20-dione. | 5 | 21-acetoxy-6β-chloro-16α-methyl-$\Delta^4$-10α-pregnene-17α, 19-diol-3, 20-dione. |
| 6β-fluoro-$\Delta^4$-10α-pregnene-17α, 19-diol-3, 20-dione. | 6 | 21-acetoxy-6β-fluoro-$\Delta^4$-10α-pregnene-17α, 19-diol-3, 20-dione. |
| 6β-fluoro-16α-methyl-$\Delta^4$-10α-pregnene-17α, 19-diol-3, 20-dione. | 7 | 21-acetoxy-6β-fluoro-16α-methyl-$\Delta^4$-10α-pregnene-17α, 19-diol-3, 20-dione. |
| 6α-chloro-$\Delta^4$-10α-pregnene-17α, 19-diol-3, 20-dione. | 8 | 21-acetoxy-6α-chloro-$\Delta^4$-10α-pregnene-17α, 19-diol-3, 20-dione. |
| 6α-chloro-16α-methyl-$\Delta^4$-10α-pregnene-17α, 19-diol-3, 20-dione. | 9 | 21-acetoxy-6α-chloro-16α-methyl-$\Delta^4$-10α-pregnene-17α, 19-diol-3, 20-dione. |
| 6α-fluoro-$\Delta^4$-10α-pregnene-17α, 19-diol-3, 20-dione. | 10 | 21-acetoxy-6α-fluoro-$\Delta^4$-10α-pregnene-17α, 19-diol-3, 20-dione. |
| 6α-fluoro-16α-methyl-$\Delta^4$-10α-pregnene-17α, 19-diol-3, 20-dione. | 11 | 21-acetetoxy-6α-fluoro-16α-methyl-$\Delta^4$-10α-pregnene-17α, 19-diol-3, 20-dione. |
| 6β-methyl-$\Delta^4$-10α-pregnene-17α, 19-diol-3, 20-dione. | 12 | 21-acetoxy-6β-methyl-$\Delta^4$-10α-pregnene-17α, 19-diol-3, 20-dione. |
| 6α-methyl-$\Delta^4$-10α-pregnene-17α, 19-diol-3, 20-dione. | 13 | 21-acetoxy-6α-methyl-$\Delta^4$-10α-pregnene-17α, 19-diol-3, 20-dione. |
| 6β, 16α-dimethyl-$\Delta^4$-10α-pregnene-17α, 19-diol-3, 20-dione. | 14 | 21-acetoxy-6β, 16α-dimethyl-$\Delta^4$-10α-pregnene-17α, 19-diol-3, 20-dione. |
| 6α, 16α-dimethyl-$\Delta^4$-10α-pregnene-17α, 19-diol-3, 20-dione. | 15 | 21-acetoxy-6α, 16α-dimethyl-$\Delta^4$-10α-pregnene-17α, 19-diol-3, 20-dione. |
| 6β-chloro-16α, 17α-isopropylidenedioxy-$\Delta^4$-10α-pregnen-19-ol-3, 20-dione. | 16 | 21-acetoxy-6β-chloro-16α, 17α-isopropylidenedioxy-$\Delta^4$-10α-pregnen-19-ol-3, 20-dione. |
| 6β-fluoro-16α, 17α-isopropylidenedioxy-$\Delta^4$-10α-pregnen-19-ol-3, 20-dione. | 17 | 21-acetoxy-6β-fluoro-16α, 17α-isopropylidenedioxy-$\Delta^4$-10α-pregnen-19-ol-3, 20-dione. |
| 6α-chloro-16α, 17α-isopropylidenedioxy-$\Delta^4$-10α-pregnen-19-ol-3, 20-dione. | 18 | 21-acetoxy-6α-chloro-16α, 17α-isopropylidenedioxy-$\Delta^4$-10α-pregnen-19-ol-3, 20-dione. |
| 6α-fluoro-16α, 17α-isopropylidenedioxy-$\Delta^4$-10α-pregnen-19-ol-3, 20-dione. | 19 | 21-acetoxy-6α-fluoro-16α, 17α-isopropylidenedioxy-$\Delta^4$-10α-pregnen-19-ol-3, 20-dione. |
| 6β-methyl-16α, 17α-isopropylidenedioxy-$\Delta^4$-10α-pregnen-19-ol-3, 20-dione. | 20 | 21-acetoxy-6β-methyl-16α, 17α-isopropylidenedioxy-$\Delta^4$-10α-pregnen-19-ol-3, 20-dione. |
| 6α-methyl-16α, 17α-isopropylidenedioxy-$\Delta^4$-10α-pregnen-19-ol-3, 20-dione. | 21 | 21-acetoxy-6α-methyl-16α, 17α-isopropylidenedioxy-$\Delta^4$-10α-pregnen-19-ol-3, 20-dione. |

*Example II*

The following solutions of "A," "B" and "C" were prepared using distilled water as solvent: solution "A" was prepared by mixing 425 cc. of a 1.742% dipotassic phosphate solution ($K_2HPO_4$) with 75 cc. of 1.38% monosodic phosphate; solution "B" was prepared by diluting a mixture of 1 lt. of 4.5% sodium chloride solution, 40 cc. of a 5.75% potassium chloride solution and 10 cc. of a 19.1% magnesium sulfate, to a volume of 5 lt.; solution "C" was prepared by dissolving 20.9 g. of fumaric acid and 14.4 g. of sodium hydroxide in 1 lt. of water and diluting the solution to 1.2 lt. Then 475 cc. of solution "A," 4.32 lt. of solution "B" and 1.2 lt. of solution "C" were mixed.

Adrenal glands of recently slaughtered cattle, defatted, were grounded in a meat grinder until a homogeneous mass was obtained; to 1 kg. of homogenate was added 2 liters of the mixture of A, B, and C solutions with vigorous stirring. To the mixture there was then added 1 g. of compound No. 1 dissolved in 5.35 parts of propylenglycol, the mixture was stirred at 28–37° C. for 3 hours, 13 liters of acetone were added and the mass was stirred at room temperature for an additional 1 hour.

The acetone extract was separated by filtration, the ground adrenals were washed with 6 liters of acetone, the extracts were combined and the solvent removed by distillation under reduced pressure. Chromatography on alumina and crystallization of the solid fractions afforded 21 - acetoxy - $16\alpha,17\alpha$ - isopropylidenedioxy-$\Delta^4$-10$\alpha$-pregnene-11$\beta$,19-diol-3,20-dione (Cpd. No. 22).

When applying the above procedure to the compounds Nos. 2 to 21 inclusive, there were respectively obtained.

Cpd. No.:
23. 21-acetoxy-$\Delta^4$-10$\alpha$-pregnene-11$\beta$,17$\alpha$,19-triol-3,20-dione,
24. 21-acetoxy-16$\alpha$-methyl-$\Delta^4$-10$\alpha$-pregnene-11$\beta$,17$\alpha$,19-triol-3,20-dione,
25. 21-acetoxy-6$\beta$-chloro-$\Delta^4$-10$\alpha$-pregnene-11$\beta$,17$\alpha$,19-triol-3,20-dione,
26. 21-acetoxy-6$\beta$-chloro-16$\alpha$-methyl-$\Delta^4$-10$\alpha$-pregnene-11$\beta$,17$\alpha$,19-triol-3,20-dione,
27. 21-acetoxy-6$\beta$-fluoro-$\Delta^4$-10$\alpha$-pregnene-11$\beta$,17$\alpha$,19-triol-3,20-dione,
28. 21-acetoxy-6$\beta$-fluoro-16$\alpha$-methyl-$\Delta^4$-10$\alpha$-pregnene-11$\beta$,17$\alpha$,19-triol-3,20-dione,
29. 21-acetoxy-6$\alpha$-chloro-$\Delta^4$-10$\alpha$-pregnene-11$\beta$,17$\alpha$,19-triol-3,20-dione,
30. 21-acetoxy-6$\alpha$-chloro-16$\alpha$-methyl-$\Delta^4$-10$\alpha$-pregnene-11$\beta$,17$\alpha$,19-triol-3,20-dione,
31. 21-acetoxy-6$\alpha$-fluoro-$\Delta^4$-10$\alpha$-pregnene-11$\beta$,17$\alpha$,19-triol-3,20-dione,
32. 21-acetoxy-6$\alpha$-fluoro-16$\alpha$-methyl-$\Delta^4$-10$\alpha$-pregnene-11$\beta$,17$\alpha$-,19-triol-3,20-dione,
33. 21-acetoxy-6$\beta$-methyl-$\Delta^4$-10$\alpha$-pregnene-11$\beta$,17$\alpha$,19-triol-3,20-dione,
34. 21-acetoxy-6$\alpha$-methyl-$\Delta^4$-10$\alpha$-pregnene-11$\beta$,17$\alpha$,19-triol-3,20-dione,
35. 21-acetoxy-6$\beta$,16$\alpha$-dimethyl-$\Delta^4$-10$\alpha$-pregnene-11$\beta$,17$\alpha$,19-triol-3,20-dione,
36. 21-acetoxy-6$\alpha$,16$\alpha$-dimethyl-$\Delta^4$-10$\alpha$-pregnene-11$\beta$,17$\alpha$,19-triol-3,20-dione,
37. 21-acetoxy-6$\beta$-chloro-16$\alpha$,17$\alpha$-isopropylidenedioxy-$\Delta^4$-10$\alpha$-pregnene-11$\beta$,19-diol-3,20-dione,
38. 21-acetoxy-6$\beta$-fluoro-16$\alpha$,17$\alpha$-isopropylidenedioxy-$\Delta^4$-10$\alpha$-pregnene-11$\beta$,19-diol-3,20-dione,
39. 21-acetoxy-6$\alpha$-chloro-16$\alpha$,17$\alpha$-isopropylidenedioxy-$\Delta^4$-10$\alpha$-pregnene-11$\beta$,19-diol-3,20-dione,
40. 21-acetoxy-6$\alpha$-fluoro-16$\alpha$,17$\alpha$-isopropylidenedioxy-$\Delta^4$-10$\alpha$-pregnene-11$\beta$,19-diol-3,20-dione,
41. 21-acetoxy-6$\beta$-methyl-16$\alpha$,17$\alpha$-isopropylidenedioxy-$\Delta^4$-10$\alpha$-pregnene-11$\beta$,19-diol-3,20-dione,
42. 21-acetoxy-6$\alpha$-methyl-16$\alpha$,17$\alpha$-isopropylidenedioxy-$\Delta^4$-10$\alpha$-pregnene-11$\beta$,19-diol-3,20-dione,

*Example III*

A mixture of 10 g. of Compound No. 22, 40 cc. of pyridine and 1.1 molar equivalents of acetic anhydride was kept at room temperature overnight, poured into ice water, the formed precipitate was filtered, washed with water and dried. Crystallization from acetone-hexane gave 19,21-diacetoxy - $16\alpha,17\alpha$ - isopropylidenedioxy-$\Delta^4$-10$\alpha$-pregnen-11$\beta$-ol-3,20-dione (Cpd. No. 43).

10 g. of the latter compound was dissolved with slow heating in 125 cc. of dimethyl-formamide, the mixture was cooled, 4.2 g. of mesyl chloride and 5 cc. of pyridine were added and the solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished 19,21 - diacetoxy - $16\alpha,17\alpha$-isopropylidenedioxy-$\Delta^{4,9(11)}$-10$\alpha$-pregnadiene-3,20-dione (Cpd. No. 44).

28 g. of N-bromoacetamide were added to a mixture of 5 g. of Compound No. 44, 50 cc. of pure dioxane and 0.8 cc. of 0.4 N perchloric acid while stirring in the dark and at room temperature during 1 hour. The reaction mixture was stirred for 1 hour further, a solution of 10% sodium sulfite was then added until the potassium-starch indicator paper no longer turned blue, ice was added, the mixture was extracted with chloroform and the extract was washed consecutively with water, 5% aqueous sodium bicarbonate solution and water, and the solvent was removed by distillation under vacuo. By trituration of the residue with acetone there was obtained the corresponding 9$\alpha$-bromo-11$\beta$-hydroxy derivative.

A mixture of 2 g. of anhydrous potassium acetate and 20 cc. of acetone was heated almost to boiling and then a solution of 1.7 g. of the bromohydrin in 20 cc. of acetone was added slowly while stirring; the mixture was then refluxed for 10 hours, cooled and almost all of the acetone was distilled off; iced-water was then added, the precipitate was filtered, washed with water and dried. Upon recrystallization from methylene chloride-benzene there was obtained 19,21-diacetoxy - $16\alpha,17\alpha$ - isopropylidenedioxy-9$\beta$,11$\beta$-oxido-$\Delta^4$-10$\alpha$-pregnene - 3,20 - dione (Cpd. No. 45).

In a polyethylene flask, adapted with magnetic stirrer, there was dissolved 1.3 g. of compound No. 45, in 30 cc. of methylene chloride, the solution was cooled to 0° C. and a solution of 2.11 g. of anhydrous hydrogen fluoride in 3.7 cc. of tetrahydrofurane cooled in a Dry-Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby there crystallized 19,21-diacetoxy - 9$\alpha$ - fluoro - $16\alpha,17\alpha$ - isopropylidenedioxy-$\Delta^4$-10$\alpha$-pregnen-11$\beta$-ol-3,20-dione (Cpd. No. 46).

The compounds Nos. 23 to 42, inclusive, were treated according to the above procedures, thus yielding successively, the correspondingly 19,21-diacetoxy derivatives, the corresponding 19,21-diacetoxy-$\Delta^{4,9(11)}$-derivatives, the corresponding 19,21-diacetoxy-9$\alpha$-bromo - 11$\beta$ - hydroxy-derivatives, the corresponding 19,21 - diacetoxy-9$\beta$,11$\beta$-oxido compounds and finally, respectively, the following compounds.

Cpd. No.:
47. 19,21-diacetoxy-9$\alpha$-fluoro-$\Delta^4$-10$\alpha$-pregnene-11$\beta$,17$\alpha$-diol-3,20-dione,
48. 19,21-diacetoxy-9$\alpha$-fluoro-16$\alpha$-methyl-$\Delta^4$-10$\alpha$-pregnene-11$\beta$,17$\alpha$-diol-3,20-dione,
49. 19,21-diacetoxy-9$\alpha$-fluoro-16$\alpha$-methyl-$\Delta^4$-10$\alpha$-pregnene-11$\beta$,17$\alpha$-diol-3,20-dione,
50. 19,21-diacetoxy-6$\beta$-chloro-9$\alpha$-fluoro-16$\alpha$-methyl-$\Delta^4$-10$\alpha$-pregnene-11$\beta$,17$\alpha$-diol-3,20-dione,
51. 19,21-diacetoxy-6$\beta$,9$\alpha$-difluoro-$\Delta^4$-10$\alpha$-pregnene-11$\beta$,17$\alpha$-diol-3,20-dione,
52. 19,21-diacetoxy-6$\beta$,9$\alpha$-difluoro-16$\alpha$-methyl-$\Delta^4$-10$\alpha$-pregnene-11$\beta$,17$\alpha$-diol-3,20-dione,
53. 19,21-diacetoxy-6$\alpha$-chloro-9$\alpha$-fluoro-$\Delta^4$-10$\alpha$-pregnene-11$\beta$,17$\alpha$-diol-3,20-dione,
54. 19,21-diacetoxy-6$\alpha$-chloro-9$\alpha$-fluoro-16$\alpha$-methyl-$\Delta^4$-10$\alpha$-pregnene-11$\beta$,17$\alpha$-diol-3,20-dione, Cpd. No.:
55. 19,21-diacetoxy-6α,9α-difluoro-Δ⁴-10α-pregnene-11β,17α-diol-3,20-dione,
56. 19,21-diacetoxy-6α,9α-difluoro-6α-methyl-Δ⁴-10α-pregnene-11β,17α-diol-3,20-dione,
57. 19,21-diacetoxy-9α-fluoro-6β-methyl-Δ⁴-10α-pregnene-11β,17α-diol-3,20-dione,
58. 19,21-diacetoxy-9α-fluoro-6α-methyl-Δ⁴-10α-pregnene-11β,17α-diol-3,20-dione,
59. 19,21-diacetoxy-9α-fluoro-6β,16α-dimethyl-Δ⁴-10α-pregnene-11β,17α-diol-3,20-dione,
60. 19,21-diacetoxy-9α-fluoro-6α,16α-dimethyl-Δ⁴-10α-pregnene-11β,17α-diol-3,20-dione,
61. 19,21-diacetoxy-6β-chloro-9α-fluoro-16α,17α-isopropylidenedioxy-Δ⁴-10α-pregnen-11β-ol-3,20-dione,
62. 19,21-diacetoxy-6α,9α-difluoro-16α,17α-isopropylidenedioxy-Δ⁴-10α-pregnen-11β-ol-3,20-dione,
63. 19,21-diacetoxy-6α-chloro-9α-fluoro-16α,17α-isopropylidenedioxy-Δ⁴-10α-pregnen-11β-ol-3,20-dione,
64. 19,21-diacetoxy-6α,9α-difluoro-16α,17α-isopropylidenedioxy-Δ⁴-10α-pregnen-11β-ol-3,20-dione,
65. 19,21-diacetoxy-9α-fluoro-6β-methyl-16α,17α-isopropylidenedioxy-Δ⁴-10α-pregnen-11β-ol-3,20-dione,
66. 19,21-diacetoxy-9α-fluoro-6α-methyl-16α,17α-isopropylidenedioxy-Δ⁴-10α-pregnen-11β-ol-3,20-dione.

*Example IV*

To a solution of 4 g. of compound No. 46, in 40 cc. of anhydrous chloroform, was added, over a period of 35 minutes, 30 cc. of a 0.45 N solution of dry hydrogen chloride in chloroform, under continuous stirring and maintaining the temperature around 0° C. The mixture was then stirred at 0° C. for 1 hour further, diluted with water and the chloroform layer was separated, washed with aqueous sodium bicarbonate solution and then with water, dried over anhydrous sodium sulfate and evaporated under reduced pressure. Crystallization of the residue from acetone-hexane gave 19,21-diacetoxy - 9α - chloro-16α,17α - isopropylidenedioxy - Δ⁴ - 10α - pregnen - 11β-ol-3,20-dione (Cpd. No. 67).

The compounds Nos. 23 to 42, inclusive, were converted into the corresponding 19,21-diacetoxy - 9β,11β-oxido compounds, in accordance with the procedure described in Example III, which were thereafter treated by the latter method, thus yielding respectively.

Cpd. No.:
68. 19,21-diacetoxy-9α-chloro-Δ⁴-10α-pregnene-11β,17α-diol-3,20-dione,
69. 19,21-diacetoxy-9α-chloro-16α-methyl-Δ⁴-10α-pregnene-11β,17α-diol-3,20-dione,
70. 19,21-diacetoxy-6β,9α-dichloro-Δ⁴-10α-pregnene-11β,17α-diol-3,20-dione,
71. 19,21-diacetoxy-6β,9α-dichloro-16α-methyl-Δ⁴-10α-pregnene-11β,17α-diol-3,20-dione,
72. 19,21-diacetoxy-6β-fluoro-9α-chloro-Δ⁴-10α-pregnene-11β,17α-diol-3,20-dione,
73. 19,21-diacetoxy-6β-fluoro-9α-chloro-16α-methyl-Δ⁴-10α-pregnene-11β,17α-diol-3,20-dione,
74. 19,21-diacetoxy-6α,9α-dichloro-Δ⁴-10α-pregnene-11β,17α-diol-3,20-dione,
75. 19,21-diacetoxy-6α,9α-dichloro-16α-methyl-Δ⁴-10α-pregnene-11β,17α-diol-3,20-dione,
76. 19,21-diacetoxy-6α-fluoro-9α-chloro-Δ⁴-10α-pregnene-11β,17α-diol-3,20-dione,
77. 19,21-diacetoxy-6α-fluoro-9α-chloro-16α-methyl-Δ⁴-10α-pregnene-11β,17α-diol-3,20-dione,
78. 19,21-diacetoxy-9α-chloro-6β-methyl-Δ⁴-10α-pregnene-11β,17α-diol-3,20-dione,
79. 19,21-diacetoxy-9α-chloro-6α-methyl-Δ⁴-10α-pregnene-11β,17α-diol-3,20-dione,
80. 19,21-diacetoxy-9α-chloro-6β,16α-dimethyl-Δ⁴-10α-pregnene-11β,17α-diol-3,20-dione,
81. 19,21-diacetoxy-9α-chloro-6α,16α-dimethyl-Δ⁴-10α-pregnene-11β,17α-diol-3,20-dione,
82. 19,21-diacetoxy-6β,9α-dichloro-16α,17α-isopropylidenedioxy-Δ⁴-10α-pregnen-11β-ol-3,20-dione,
83. 19,21-diacetoxy-6β-fluoro-9α-chloro-16α,17α-isopropylidenedioxy-Δ⁴-10α-pregnen-11β-ol-3,20-dione,
84. 19,21-diacetoxy-6α,9α-dichloro-16α,17α-isopropylidenedioxy-Δ⁴-10α-pregnen-11β-ol-3,20-dione,
85. 19,21-diacetoxy-6α-fluoro-9α-chloro-16α,17α-isopropylidenedioxy-Δ⁴-10α-pregnen-11β-ol-3,20-dione,
86. 19,21-diacetoxy-9α-chloro-6β-methyl-16α,17α-isopropylidenedioxy-Δ⁴-10α-pregnen-11β-ol-3,20-dione,
87. 19,21-diacetoxy-9α-chloro-6α-methyl-16α,17α-isopropylidenedioxy-Δ⁴-10α-pregnen-11β-ol-3,20-dione.

*Example V*

A solution of 1 g. of 19,21-diacetoxy-16α,17α-isopropylidenedioxy-Δ⁴-10α-pregnen - 11β - ol-3,20-dione (Cpd. No. 43), in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 19,21-diacetoxy-16α,17α-isopropylidenedioxy-Δ⁴-10α-pregnene-3,11,20-trione (Cpd. No. 88).

The 19,21-diacetoxy derivatives of compounds Nos. 23 to 42, inclusive, obtained in accordance with the first procedure described in Example III, were converted by the latter procedure, respectively, into the following products.

Cpd. No.:
89. 19,21-diacetoxy-Δ⁴-10α-pregnen-17α-ol-3,11,20-trione,
90. 19,21-diacetoxy-16α-methyl-Δ⁴-10α-pregnen-17α-ol-3,11,20-trione,
91. 19,21-diacetoxy-6β-chloro-Δ⁴-10α-pregnen-17α-ol-3,11,20-trione,
92. 19,21-diacetoxy-6β-chloro-16α-methyl-Δ⁴-10α-pregnen-17α-ol-3,11,20-trione,
93. 19,21-diacetoxy-6β-fluoro-Δ⁴-10α-pregnen-17α-ol-3,11,20-trione,
94. 19,21-diacetoxy-6β-fluoro-16α-methyl-Δ⁴-10α-pregnen-17α-ol-3,11,20-trione,
95. 19,21-diacetoxy-6α-chloro-Δ⁴-10α-pregnen-17α-ol-3,11,20-trione,
96. 19,21-diacetoxy-6α-chloro-16α-methyl-Δ⁴-10α-pregnen-17α-ol-3,11,20-trione,
97. 19,21-diacetoxy-6α-fluoro-Δ⁴-10α-pregnen-17α-ol-3,11,20-trione,
98. 19,21-diacetoxy-6α-fluoro-16α-methyl-Δ⁴-10α-pregnen-17α-ol-3,11,20-trione,
99. 19,21-diacetoxy-6β-methyl-Δ⁴-10α-pregnen-17α-ol-3,11,20-trione,
100. 19,21-diacetoxy-6α-methyl-Δ⁴-10α-pregnen-17α-ol-3,11,20-trione,
101. 19,21-diacetoxy-6β,16α-dimethyl-Δ⁴-10α-pregnen-17α-ol-3,11,20-trione,
102. 19,21-diacetoxy-6α,16α-dimethyl-Δ⁴-10α-pregnen-17α-ol-3,11,20-trione,
103. 19,21-diacetoxy-6β-chloro-16α,17α-isopropylidenedioxy-Δ⁴-10α-pregnene-3,11,20-trione, Cpd. No.:
- 104. 19,21-diacetoxy-6β-fluoro-16α,17α-isopropylidenedioxy-Δ⁴-10α-pregnene-3,11,20-trione,
- 105. 19,21-diacetoxy-6α-chloro-16α,17α-isopropylidenedioxy-Δ⁴-10α-pregnene-3,11,20-trione,
- 106. 19,21-diacetoxy-6α-fluoro-16α,17α-isopropylidenedioxy-Δ⁴-10α-pregnene-3,11,20-trione,
- 107. 19,21-diacetoxy-6β-methyl-16α,17α-isopropylidenedioxy-Δ⁴-10α-pregnene-3,11,20-trione,
- 108. 19,21-diacetoxy-6α-methyl-16α,17α-isopropylidenedioxy-Δ⁴-10α-pregnene-3,11,20-trione.

*Example VI*

The compounds Nos. 46 to 87, inclusive, were treated following exactly the procedure described in Example V, thus affording—

Cpd. No.:
- 109. 19,21-diacetoxy-9α-fluoro-16α,17α-isopropylidenedioxy-Δ⁴-10α-pregnene-3,11,20-trione,
- 110. 19,21-diacetoxy-9α-fluoro-Δ⁴-10α-pregnen-17α-ol-3,11,20-trione,
- 111. 19,21-diacetoxy-9α-fluoro-16α-methyl-Δ⁴-10α-pregnen-17α-ol-3,11,20-trione,
- 112. 19,21-diacetoxy-6β-chloro-9α-fluoro-Δ⁴-10α-pregnen-17α-ol-3,11,20-trione,
- 113. 19,21-diacetoxy-6β-chloro-9α-fluoro-16α-methyl-Δ⁴-10α-pregnen-17α-ol-3,11,20-trione,
- 114. 19,21-diacetoxy-6β,9α-difluoro-Δ⁴-10α-pregnen-17α-ol-3,11,20-trione,
- 115. 19,21-diacetoxy-6β,9α-difluoro-16α-methyl-Δ⁴-10α-pregnen-17α-ol-3,11,20-trione,
- 116. 19,21-diacetoxy-6α-chloro-9α-fluoro-Δ⁴-10α-pregnen-17α-ol-3,11,20-trione,
- 117. 19,21-diacetoxy-6α-chloro-9α-fluoro-16α-methyl-Δ⁴-10α-pregnen-17α-ol-3,11,20-trione,
- 118. 19,21-diacetoxy-6α,9α-difluoro-Δ⁴-10α-pregnen-17α-ol-3,11,20-trione,
- 119. 19,21-diacetoxy-6α,9α-difluoro-16α-methyl-Δ⁴-10α-pregnen-17α-ol-3,11,20-trione,
- 120. 19,21-diacetoxy-9α-fluoro-6β-methyl-Δ⁴-10α-pregnen-17α-ol-3,11,20-trione,
- 121. 19,21-diacetoxy-9α-fluoro-6α-methyl-Δ⁴-10α-pregnen-17α-ol-3,11,20-trione,
- 122. 19,21-diacetoxy-6β,16α-dimethyl-Δ⁴-10α-pregnen-17α-ol-3,11,20-trione,
- 123. 19,21-diacetoxy-6α,16α-dimethyl-Δ⁴-10α-pregnen-17α-ol-3,11,20-trione,
- 124. 19,21-diacetoxy-6β-chloro-9α-fluoro-16α,17α-isopropylidenedioxy-Δ⁴-10α-pregnene-3,11,20-trione,
- 125. 19,21-diacetoxy-6β,9α-difluoro-16α,17α-isopropylidenedioxy-Δ⁴-10α-pregnene-3,11,20-trione,
- 126. 19,21-diacetoxy-6α-chloro-9α-fluoro-16α,17α-isopropylidenedioxy-Δ⁴-10α-pregnene-3,11,20-trione,
- 127. 19,21-diacetoxy-6α,9α-difluoro-16α,17α-isopropylidenedioxy-Δ⁴-10α-pregnene-3,11,20-trione,
- 128. 19,21-diacetoxy-9α-fluoro-6β-methyl-16α,17α-isopropylidenedioxy-Δ⁴-10α-pregnene-3,11,20-trione,
- 129. 19,21-diacetoxy-9α-fluoro-6α-methyl-16α,17α-isopropylidenedioxy-Δ⁴-10α-pregnene-3,11,20-trione,
- 130. 19,21-diacetoxy-9α-chloro-16α,17α-isopropylidenedioxy-Δ⁴-10α-pregnene-3,11,20-trione,
- 131. 19,21-diacetoxy-9α-chloro-Δ⁴-10α-pregnen-17α-ol-3,11,20-trione,
- 132. 19,21-diacetoxy-9α-chloro-16α-methyl-Δ⁴-10α-pregnen-17α-ol-3,11,20-trione,
- 133. 19,21-diacetoxy-6β,9α-dichloro-Δ⁴-10α-pregnen-17α-ol-3,11,20-trione,
- 134. 19,21-diacetoxy-6β,9α-dichloro-16α-methyl-Δ⁴-10α-pregnen-17α-ol-3,11,20-trione,
- 135. 19,21-diacetoxy-6β-fluoro-9α-chloro-Δ⁴-10α-pregnen-17α-ol-3,11,20-trione,
- 136. 19,21-diacetoxy-6β-fluoro-9α-chloro-16α-methyl-Δ⁴-10α-pregnen-17α-ol-3,11,20-trione,
- 137. 19,21-diacetoxy-6α,9α-dichloro-Δ⁴-10α-pregnen-17α-ol-3,11,20-trione,
- 138. 19,21-diacetoxy-6α,9α-dichloro-16α-methyl-Δ⁴-10α-pregnen-17α-ol-3,11,20-trione,
- 139. 19,21-diacetoxy-6α-fluoro-9α-chloro-Δ⁴-10α-pregnen-17α-ol-3,11,20-trione,
- 140. 19,21-diacetoxy-6α-fluoro-9α-chloro-16α-methyl-Δ⁴-10α-pregnen-17α-ol-3,11,20-trione,
- 141. 19,21-diacetoxy-9α-chloro-6β-methyl-Δ⁴-10α-pregnen-17α-ol-3,11,20-trione,
- 142. 19,21-diacetoxy-9α-chloro-6α-methyl-Δ⁴-10α-pregnen-17α-ol-3,11,20-trione,
- 143. 19,21-diacetoxy-9α-chloro-6β,16α-dimethyl-Δ⁴-10α-pregnen-17α-ol-3,11,20-trione,
- 144. 19,21-diacetoxy-9α-chloro-6α,16α-dimethyl-Δ⁴-10α-pregnen-17α-ol-3,11,20-trione,
- 145. 19,21-diacetoxy-6β,9α-dichloro-16α,17α-isopropylidenedioxy-Δ⁴-10α-pregnene-3,11,20-trione,
- 146. 19,21-diacetoxy-6β-fluoro-9α-chloro-16α,17α-isopropylidenedioxy-Δ⁴-10α-pregnene-3,11,20-trione,
- 147. 19,21-diacetoxy-6α,9α-dichloro-16α,17α-isopropylidenedioxy-Δ⁴-10α-pregnene-3,11,20-trione,
- 148. 19,21-diacetoxy-6α-fluoro-9α-chloro-16α,17α-isopropylidenedioxy-Δ⁴-10α-pregnene-3,11,20-trione,
- 149. 19,21-diacetoxy-9α-chloro-6β-methyl-16α,17α-isopropylidenedioxy-Δ⁴-10α-pregnene-3,11,20-trione,
- 150. 19,21-diacetoxy-9α-chloro-6α-methyl-16α,17α-isopropylidenedioxy-Δ⁴-10α-pregnene-3,11,20-trione,

*Example VII*

2 g. of 21-acetoxy-16α,17α-isopropylidenedioxy-Δ⁴-10α-pregnene-11β,19-diol-3,20-dione (Cpd. No. 22) was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 16α, 17α - isopropylidenedioxy - Δ⁴ - 10α - pregnene - 11β,19, 21-triol-3,20-dione (Cpd. No. 151).

When applying the above procedure to the compounds Nos. 23 to 42, inclusive, there were respectively obtained—

Cpd. No.:
- 152. Δ⁴-10α-pregnene-11β,17α,19,21-tetrol-3,20-dione,
- 153. 16α-methyl-Δ⁴-10α-pregnene-11β,17α,19,21-tetrol-3,20-dione,
- 154. 6β-chloro-Δ⁴-10α-pregnene-11β,17α,19,21-tetrol-3,20-dione,
- 155. 6β-chloro-16α-methyl-Δ⁴-10α-pregnene-11β,17α,19,21-tetrol-3,20-dione,
- 156. 6β-fluoro-Δ⁴-10α-pregnene-11β,17α,19,21-tetrol-3,20-dione,
- 157. 6β-fluoro-16α-methyl-Δ⁴-10α-pregnene-11β,17α,19,21-tetrol-3,20-dione,
- 158. 6α-chloro-Δ⁴-10α-pregnene-11β,17α,19,21-tetrol-3,20-dione,
- 159. 6α-chloro-16α-methyl-Δ⁴-10α-pregnene-11β,17α,19,21-tetrol-3,20-dione,
- 160. 6α-fluoro-Δ⁴-10α-pregnene-11β,17α,19,21-tetrol-3,20-dione,
- 161. 6α-fluoro-16α-methyl-Δ⁴-10α-pregnene-11β,17α,19,21-tetrol-3,20-dione, Cpd. No.:
162. 6β-methyl-Δ⁴-10α-pregnene-11β,17α,19,21-tetrol-3,20-dione,
163. 6α-methyl-Δ⁴-10α-pregnene-11β,17α,19,21-tetrol-3,20-dione,
164. 6β,16-dimethyl-Δ⁴-10α-pregnene-11β,17α,19,21-tetrol-3,20-dione,
165. 6α,16α-dimethyl-Δ⁴-10α-pregnene-11β,17α,19,21-tetrol-3,20-dione,
166. 6β-chloro-16α,17α-isopropylidenedioxy-Δ⁴-10α-pregnene-11β,19,21-triol-3,20-dione,
167. 6β-fluoro-16α,17α-isopropylidenedioxy-Δ⁴-10α-pregnene-11β,19,21-triol-3,20-dione,
168. 6α-chloro-16α,17α-isopropylidenedioxy-Δ⁴-10α-pregnene-11β,19,21-triol-3,20-dione,
169. 6α-fluoro-16α,17α-isopropylidenedioxy-Δ⁴-10α-pregnene-11β,19,21-triol-3,20-dione,
170. 6β-methyl-16α,17α-isopropylidenedioxy-Δ⁴-10α-pregnene-11β,19,21-triol-3,20-dione,
171. 6α-methyl-16α,17α-isopropylidenedioxy-Δ⁴-10α-pregnene-11β,19,21-triol-3,20-dione.

Example VIII

The compounds Nos. 88 to 108, inclusive, were treated in accordance with Example VII, thus furnishing respectively—

Cpd. No.:
172. 16α,17α-isopropylidenedioxy-Δ⁴-10α-pregnene-19,21-diol-3,11,20-trione,
173. Δ⁴-10α-pregnene-17α,19,21-triol-3,11,20-trione,
174. 16α-methyl-Δ⁴-10α-pregnene-17α,19,21-triol-3,11,20-trione,
175. 6β-chloro-Δ⁴-10α-pregnene-17α,19,21-triol-3,11,20-trione,
176. 6β-chloro-16α-methyl-Δ⁴-10α-pregnene-17α,19,21-triol-3,11,20-trione,
177. 6β-fluoro-Δ⁴-10α-pregnene-17α,19,21-triol-3,11,20-trione,
178. 6β-fluoro-16α-methyl-Δ⁴-10α-pregnene-17α,19,21-triol-3,11,20-trione,
179. 6α-chloro-Δ⁴-10α-pregnene-17α,19,21-triol-3,11,20-trione,
180. 6α-chloro-16α-methyl-Δ⁴-10α-pregnene-17α,19,21-triol-3,11,20-trione,
181. 6α-fluoro-Δ⁴-10α-pregnene-17α,19,21-triol-3,11,20-trione,
182. 6α-fluoro-16α-methyl-Δ⁴-10α-pregnene-17α,19,21-triol-3,11,20-trione,
183. 6β-methyl-Δ⁴-10α-pregnene-17α,19,21-triol-3,11,20-trione,
184. 6α-methyl-Δ⁴-10α-pregnene-17α,19,21-triol-3,11,20-trione,
185. 6β,16-dimethyl-Δ⁴-10α-pregnene-17α,19,21-triol-3,11,20-trione,
186. 6α,16α-dimethyl-Δ⁴-10α-pregnene-17α,19,21-triol-3,11,20-trione,
187. 6β-chloro-16α,17α-isopropylidenedioxy-Δ⁴-10α-pregnene-19,21-diol-3,11,20-trione,
188. 6β-fluoro-16α,17α-isopropylidenedioxy-Δ⁴-10α-pregnene-19,21-diol-3,11,20-trione,
189. 6α-chloro-16α,17α-isopropylidenedioxy-Δ⁴-10α-pregnene-19,21-diol-3,11,20-trione,
190. 6α-fluoro-16α,17α-isopropylidenedioxy-Δ⁴-10α-pregnene-19,21-diol-3,11,20-trione,
191. 6β-methyl-16α,17α-isopropylidenedioxy-Δ⁴-10α-pregnene-19,21-diol-3,11,20-trione,
192. 6α-methyl-16α,17α-isopropylidenedioxy-Δ⁴-10α-pregnene-19,21-diol-3,11,20-trione.

Example IX

The compounds Nos. 46, 68 and 109, were treated according to Example VII, thus furnishing respectively: 9α - fluoro - 16α,17α - isopropylidenedioxy-Δ⁴-10α-pregnene - 11β,19,21 - triol - 3,20-dione (Cpd. No. 193), 9α-chloro - Δ⁴ - 10α - pregnene - 11β,17α,19,21-tetrol-3,20-dione (Cpd. No. 194), and 9α - fluoro - 16α,17α-isopropylidenedioxy - Δ⁴ - 10α - pregnene-19,21-diol-3,11,20-trione (Cpd. No. 195).

Example X

A mixture of 500 mg. of 16α,17α-isopropylidenedioxy-Δ⁴ - 10α-pregnene-11β,19,21-triol-3,20-dione (Cpd. No. 151), 10 cc. of dioxane and 350 mg. of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 16α,17α-isopropylidenedioxy - Δ¹,⁴ - 10α-pregnadiene-11β,19,21-triol-3,20-dione (Cpd. No. 196).

The compounds Nos. 152, 153, 154, 156, 158, 163, 168, 172, 173, 174, 179, and 184, were treated according to the above described procedure, thus yielding respectively—

Cpd. No.:
197. Δ¹,⁴-10α-pregnadiene-11β,17α,19,21-tetrol-3,20-dione,
198. 16α-methyl-Δ¹,⁴-10α-pregnadiene-11β,17α,19,21-tetrol-3,20-dione,
199. 6β-chloro-Δ¹,⁴-10α-pregnadiene-11β,17α,19,21-tetrol-3,20-dione,
200. 6β-fluoro-Δ¹,⁴-10α-pregnadiene-11β,17α,19,21-tetrol-3,20-dione,
201. 6α-chloro-Δ¹,⁴-10α-pregnadiene-11β,17α,19,21-tetrol-3,20-dione,
202. 6α-methyl-Δ¹,⁴-10α-pregnadiene-11β,17α,19,21-tetrol-3,20-dione,
203. 6α-chloro-Δ¹,⁴-10α-pregnadiene-11β,19,21-triol-3,20-dione,
204. 16α,17α-isopropylidenedioxy-Δ¹,⁴-10α-pregnadiene-19,21-diol-3,11,20-trione,
205. Δ¹,⁴-10α-pregnadiene-17α,19,21-triol-3,11,20-trione,
206. 16α-methyl-Δ¹,⁴-10α-pregnadiene-17α,19,21-triol-3,11,20-trione,
207. 6α-chloro-Δ¹,⁴-10α-pregnadiene-17α,19,21-triol-3,11,20-trione,
208. 6α-methyl-Δ¹,⁴-10α-pregnadiene-17α,19,21-triol-3,11,20-trione.

Example XI

A mixture of 1 g. of Compound No. 151, 2 g. of chloranil and 50 cc. of terbutanol was refluxed for 8 hours. The mixture was cooled, the excess of chloranil filtered off and washed with ethyl acetate and the organic extracts washed with a cold aqueous solution of 10% sodium hydroxide until the washings were colorless. It was then dried over anhydrous sodium sulfate and evaporated to dryness. Recrystallization from methylene chloride-ether, after decolorization with 2 cc. of alumina, gave 16α,17α - isopropylidenedioxy-Δ⁴,⁶-10α-pregnadiene-11β,19,21-triol-3,20-dione (Cpd. No. 209).

The compounds Nos. 152, 153, 154, 156, 158, 163, 168, 172, 173, 174, 179, and 184 were respectively converted, under the same conditions, into—

Cpd. No.:
210. Δ⁴,⁶-10α-pregnadiene-11β,17α,19,21-tetrol-3,20-dione,
211. 16α-methylΔ⁴,⁶-10α-pregnadiene-11β,17α,19,21-tetrol-3,20-dione,
212. 6-chloro-Δ⁴,⁶-10α-pregnadiene-11β,17α,19,21-tetrol-3,20-dione,
213. 6-fluoro-Δ⁴,⁶-10α-pregnadiene-11β,17α,19,21-tetrol-3,20-dione,
214. 6-chloro-Δ⁴,⁶-10α-pregnadiene-11β,17α,19,21-tetrol-3,20-dione,
215. 6-methyl-Δ⁴,⁶-10α-pregnadiene-11β,17α,19,21-tetrol-3,20-dione, Cpd. No.:
216. 6-chloro-Δ⁴,⁶-10α-pregnadiene-11β,19,21-triol-3,20-dione,
217. 16α,17α-isopropylidenedioxy-Δ⁴,⁶-10α-pregnadiene-19,21-diol-3,11,20-trione,
218. Δ⁴,⁶-10α-pregnadiene-17α,19,21-triol-3,11,20-trione,
219. 16α-methyl-Δ⁴,⁶-10α-pregnadiene-17α,19,21-triol-3,11,20-trione,
220. 6-chloro-Δ⁴,⁶-10α-pregnadiene-17α,19,21-triol-3,11,20-trione,
221. 6-methyl-Δ⁴,⁶-10α-pregnadiene-17α,19,21-triol-3,11,20-trione.

*Example XII*

The compounds Nos. 210 to 221, inclusive, were treated according to Example X, thus furnishing respectively—

Cpd. No.:
222. Δ¹,⁴,⁶-10α-pregnatriene-11β,17α,19,21-tetrol-3,20-dione,
223. 16α-methyl-Δ¹,⁴,⁶-10α-pregnatriene-11β,17α,19,21-tetrol-3,20-dione,
224. 6-chloro-Δ¹,⁴,⁶-10α-pregnatriene-11β,17α,19,21-tetrol-3,20-dione,
225. 6-fluoro-Δ¹,⁴,⁶-10α-pregnatriene-11β,17α,19,21-tetrol-3,20-dione,
226. 6-chloro-Δ¹,⁴,⁶-10α-pregnatriene-11β,17α,19,21-tetrol-3,20-dione,
227. 6-methyl-Δ¹,⁴,⁶-10α-pregnatriene-11β,17α,19,21-tetrol-3,20-dione,
228. 6-chloro-Δ¹,⁴,⁶-10α-pregnatriene-11β,19,21-triol-3,20-dione,
229. 16α,17α-isopropylidenedioxy-Δ¹,⁴,⁶-10α-pregnatriene-19,21-diol-3,11,20-trione,
230. Δ¹,⁴,⁶-10α-pregnatriene-17α,19,21-triol-3,11,20-trione,
231. 16α-methyl-Δ¹,⁴,⁶-10α-pregnatriene-17α,19,21-triol-3,11,20-trione,
232. 6-chloro-Δ¹,⁴,⁶-10α-pregnatriene-17α,19,21-triol-3,11,20-trione,
233. 6-methyl-Δ¹,⁴,⁶-10α-pregnatriene-17α,19,21-triol-3,11,20-trione.

*Example XIII*

16α,17α - isopropylidenedioxy - Δ⁴ - 10α - pregnene-11β,19,21-triol-3,20-dione (Cpd. No. 151) was heated on the steam bath with 100 cc. of 80% acetic acid under nitrogen for 7 hours, it was then concentrated under vacuum to a small volume and poured into water. The precipitate was collected, washed well with water, dried and recrystallized from acetone-hexane, thus furnishing: Δ⁴ - 10α - pregnene - 11β,16α,17α,19,21 - pentol - 3,20-dione (Cpd. No. 234).

The compounds Nos. 168, 169, 171, 172, 189, 190, and 192, were treated following the above procedure, thus affording respectively—

Cpd. No.:
235. 6α-chloro-Δ⁴-10α-pregnene-11β,16α,17α,19,21-pentol-3,20-dione,
236. 6α-fluoro-Δ⁴-10α-pregnene-11β,16α,17α,19,21-pentol-3,20-dione,
237. 6α-methyl-Δ⁴-10α-pregnene-11β,16α,17α,19,21-pentol-3,20-dione,
238. Δ⁴-10α-pregnene-16α,17α,19,21-tetrol-3,11,20-trione,
239. 6α-chloro-Δ⁴-10α-pregnene-16α,17α,19,21-tetrol-3,11,20-trione,
240. 6α-fluoro-Δ⁴-10α-pregnene-16α,17α,19,21-tetrol-3,11,20-trione,
241. 6α-methyl-Δ⁴-10α-pregnene-16α,17α,19,21-tetrol-3,11,20-trione.

*Example XIV*

A mixture of 1 g. of compound No. 234, 4 cc. of pyridine and 2 cc. of caproic anhydride was kept at room temperature overnight, poured into ice water, the formed precipitate was filtered, washed with water and dried. Crystallization from acetone-hexane gave Δ⁴-10α-pregnene - 11β,16α,17α,19,21 - pentol - 3,20 - dione 16,19,21-tricaproate (Cpd. No. 242).

The compounds Nos. 235 to 241, inclusive, were treated by the same method, thus being respectively transformed into—

Cpd. No.:
243. 6α-chloro-Δ⁴-10α-pregnene-11β,16α,17α,19,21-pentol-3,20-dione 16,19,21-tricaproate,
244. 6α-fluoro-Δ⁴-10α-pregnene-11β,16α,17α,19,21-pentol-3,20-dione 16,19,21-tricaproate,
245. 6α-methyl-Δ-10α-pregnene-11β,16α,17α,19,21-pentol-3,20-dione 16,19,21-tricaproate,
246. Δ⁴-10α-pregnene-16α,17α,19,21-tetrol-3,11,20-trione 16,19,21-tricaproate,
247. 6α-chloro-Δ⁴-10α-pregnene-16α,17α,19,21-tetrol-3,11,20-trione 16,19,21-tricaproate,
248. 6α-fluoro-Δ⁴-10α-pregnene-16α,17α,19,21-tetrol-3,11,20-trione 16,19,21-tricaproate,
249. 6α-methyl-Δ⁴-10α-pregnene-16α,17α,19,21-tetrol-3,11,20-trione 16,19,21-tricaproate.

*Example XV*

A mixture of 1 g. of compound No. 234, 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded the 16,17-acetophenonide of Δ⁴-10α - pregnene - 11β,16α,17α,19,21 - pentol - 3,20 - dione (Cpd. No. 249).

By the same procedure there were obtained the 16,17-acetophenonides of compounds Nos. 235 to 241, inclusive.

*Example XVI*

A solution of 500 mg. of compound No. 234 in 20 cc. of chloroform was treated with 1 g. of acetaldehyde and a few drops of 3 N perchloric acid and stirred at room temperature for 2 hours. After diluting with water the chloroform layer was separated, washed with aqueous saturated sodium bicarbonate solution and then with water, the chloroform was distilled and the residue was purified by chromatography on neutral alumina, thus yielding 16α,17α - ethylidenedioxy - Δ⁴ - 10α - pregnene-11β,19,21-triol-3,20-dione (Cpd. No. 250).

I claim:
1. A compound of the following formula:

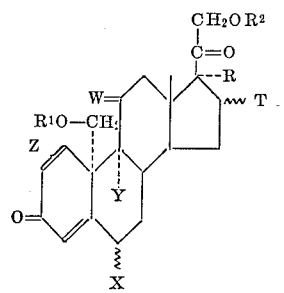

wherein R is a hydroxyl group; X is selected from the group consisting of hydrogen, α-fluorine, β-fluorine, α- chlorine, β-chlorine, α-methyl and β-methyl; T is selected from the group consisting of hydrogen, hydroxyl, a hydrocarbon carboxylic acyloxy group of less than 12 carbon atoms, and methyl, with no more than one of X and T being hydrogen, X being other than hydrogen when T is α-methyl and T being other than hydrogen when X is α-fluorine or α-methyl; R and T together form the group

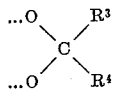

wherein $R^3$ and $R^4$ are selected from the group consisting of hydrogen and a hydrocarbon residue of up to 8 carbon atoms; $R^1$ and $R^2$ are selected from the group consisting of hydrogen and a hydrocarbon carboxylic acyl group of less than 12 carbon atoms; Z is selected from the group consisting of a double bond and a saturated linkage between C–1 and C–2; W is selected from the group consisting of a β-hydroxyl group and a keto group, and Y is selected from the group consisting of hydrogen, fluorine and chlorine.

2. 16α,17α - isopropylidenedioxy - $\Delta^4$ - 10α - pregnene-11β,19,21-triol-3,20-dione.

3. 6β - chloro - $\Delta^4$ - 10α - pregnene - 11β,17α,19,21-tetrol-3,20-dione.

4. 6β - chloro - 16α - methyl - $\Delta^4$ - 10α - pregnene-11β,17α,19,21-tetrol-3,20-dione.

5. 6β - fluoro - $\Delta^4$ - 10α - pregnene - 11β,17α,19,21-tetrol-3,20-dione.

6. 6β - fluoro - 16α - methyl - $\Delta^4$ - 10α - pregnene-11β,17α,19,21-tetrol-3,20-dione.

7. 6α - chloro - $\Delta^4$ - 10α - pregnene - 11β,17α,19,21-tetrol-3,20-dione.

8. 6α - chloro - 16α - methyl - $\Delta^4$ - 10α - pregnene-11β,17α,19,21,-tetrol-3,20-dione.

9. 6α - fluoro - 16α - methyl - $\Delta^4$ - 10α - pregnene-11β,17α,19,21-tetrol-3,20-dione.

10. 6β - methyl - $\Delta^4$ - 10α - pregnene - 11β,17α,19,21-tetrol-3,20-dione.

11. 6β,16α - dimethyl - $\Delta^4$ - 10α - pregnene - 11β,17α,19,21-tetrol-3,20-dione.

12. 6α,16α - dimethyl - $\Delta^4$ - 10α - pregnene - 11β,17α,19,21-tetrol-3,20-dione.

13. 19,21 - diacetoxy - 9α - fluoro - 6α,16α - dimethyl-$\Delta^4$-10α-pregnen-17α-ol-3,11,20-trione.

14. 19,21 - diacetoxy - 6α,9α - difluoro - 16α,17α - isopropylidenedioxy-$\Delta^4$-10α - pregnene-3,11,20-trione.

15. 19,21 - diacetoxy - 6α,9α - difluoro - 16α - methyl-$\Delta^4$-10α-pregnen-17α-ol-3,11,20-trione.

16. A compound of the following formula:

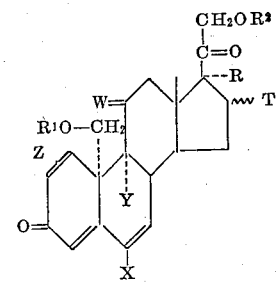

wherein R is a hydroxyl group; X is selected from the group consisting of hydrogen, fluorine, chlorine and methyl; T is selected from the group consisting of hydrogen, hydroxyl, a hydrocarbon carboxylic acyloxy group of less than 12 carbon atoms, and methyl, with no more than one of X and T being hydrogen, X being other than hydrogen when T is α-methyl and T being other than hydrogen when X is fluorine or methyl; R and T together form the group

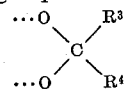

wherein $R^3$ and $R^4$ are selected from the group consisting of hydrogen and a hydrocarbon residue of up to 8 carbon atoms; $R^1$ and $R^2$ are selected from the group consisting of hydrogen and a hydrocarbon carboxylic acyl group of less than 12 carbon atoms; Z is selected from the group consisting of a double bond and a saturated linkage between C–1 and C–2; W is selected from the group consisting of a β-hydroxyl group and a keto group, and Y is selected from the group consisting of hydrogen, fluorine and chlorine.

17. 6 - chloro - $\Delta^{4,6}$ - 10α - pregnadiene - 11β,17α,19,21-tetrol-3,20-dione.

References Cited by the Examiner

UNITED STATES PATENTS 3,039,926  6/1962  Shull _____ 167—65

OTHER REFERENCES

Castells et al.: J. Chem. Soc., p. 2627–2639 (1960).
Chen: Tetrahedron 3, p. 43–48 (1958).
Fieser et al.: Steroids, pp. 138–142 (1959 ed.), Reinhold Pub. Company, N.Y.
Mayor et al.: J. Chem. Soc., p. 2792–2800 (1960).
Mayor et al.: J. Chem. Soc., p. 2800–2802 (1960).
Rappoldt et al: Rec. Trav. Chim. 80, pp. 43–46 January 1961.

LEWIS GOTTS, *Primary Examiner.*

WALTER A. MODANCE, *Examiner.*